United States Patent [19]
Rao et al.

[11] Patent Number: 5,583,564
[45] Date of Patent: Dec. 10, 1996

[54] INTELLIGENT CALL FORWARDING WITH VIDEOPHONE DISPLAY OF FORWARDING DESTINATION

[75] Inventors: Usha Rao, Aberdeen; Robert M. Rubin, Morristown, both of N.J.

[73] Assignee: Lucent Technologies Inc., Murray Hill, N.J.

[21] Appl. No.: 427,538

[22] Filed: Apr. 24, 1995

[51] Int. Cl.$^6$ .............................. H04N 7/14; H04M 3/54
[52] U.S. Cl. ........................ 348/14; 379/207; 379/210; 379/211
[58] Field of Search .......................... 379/96, 201, 207, 379/210, 211, 212; 348/15, 14

[56] References Cited

U.S. PATENT DOCUMENTS

| | | | |
|---|---|---|---|
| 4,611,094 | 9/1986 | Asmuth et al. | 379/201 |
| 4,723,273 | 2/1988 | Diesel et al. | 379/211 |
| 4,893,336 | 1/1990 | Wuthrow | 379/211 |
| 5,241,588 | 8/1993 | Babson, III et al. | 379/201 |
| 5,276,731 | 1/1994 | Arbel et al. | 379/88 |
| 5,384,831 | 1/1995 | Creswell et al. | 379/67 |
| 5,408,528 | 4/1995 | Carlson et al. | 379/211 |
| 5,422,943 | 6/1995 | Cooney et al. | 379/225 |
| 5,434,906 | 7/1995 | Robinson et al. | 379/67 |
| 5,440,620 | 8/1995 | Slusky | 379/100 |
| 5,457,738 | 10/1995 | Sylvan | 379/96 |

FOREIGN PATENT DOCUMENTS

| | | | |
|---|---|---|---|
| 498593 | 8/1992 | European Pat. Off. | 379/211 |

OTHER PUBLICATIONS

Batten, "Personal Communications Services and the Intelligent Network," British Telecommunications Engineering, vol. 9, Aug. 1990, pp. 88–91.

*Primary Examiner*—Krista M. Zele
*Assistant Examiner*—Daniel S. Hunter

[57] ABSTRACT

Intelligent call forwarding is implemented through an intelligent network. The intelligent network includes a Service Switching Point (SSP), a Service Control Point (SCP), and a Service Management System (SMS). A call to a network subscriber is routed to the SSP which is used to detect Call Forwarding "triggers"—conditions which require the SSP to initiate selective Call Forwarding service. When a Call Forwarding trigger is detected the SSP passes the calling party's number to the SCP and requests call handling instructions from the SCP. The SCP provides the call handling instructions, as provisioned by the subscriber, to the SSP, and the SSP then forwards the call in accordance with the instructions. The SMS formulates and sends commands to the SCP for such purposes as changing the stored subscriber instructions or updating service features. By provisioning the SCP with appropriate instructions the forwarding destination for a call may be made to depend upon the time of day, day of the week, caller's identity, and/or status of the called telephone.

12 Claims, 1 Drawing Sheet

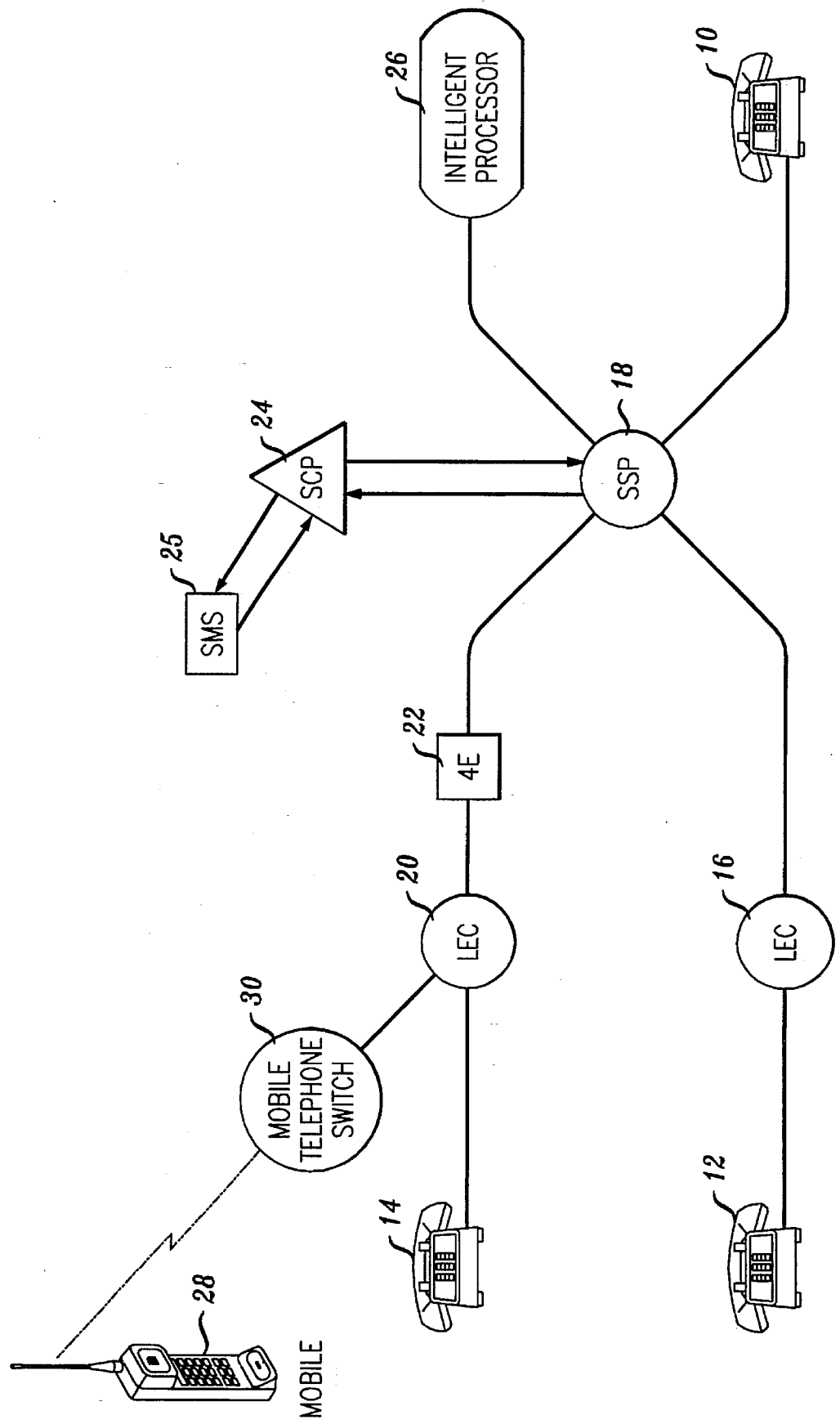

INTELLIGENT CALL FORWARDING WITH VIDEOPHONE DISPLAY OF FORWARDING DESTINATION

TECHNICAL FIELD

This invention relates to communication networks, and more particularly to providing call forwarding service to communication network subscribers.

BACKGROUND OF THE INVENTION

Establishing communication with a called party becomes difficult when that party is mobile. In general, a person wishing to contact a party by telephone initiates a call to a telephone that is in close proximity to that party, such as a home telephone or office telephone. However, the called party may not always be in close proximity to any one particular telephone at all times. Moreover, highly mobile individuals may be located near several different telephones during the course of a day and, thus become difficult to contact without a priori information of their whereabouts. This presents a problem to persons who need to contact a mobile party immediately, regardless of that party's location.

An attempt to solve the problem of establishing communication with a mobile party resulted in the technique known as "Call Forwarding". Call Forwarding is a well-known technique whereby an individual who will be away from her telephone can redirect calls to another telephone. For example, by using Call Forwarding an office worker planning to go on vacation could redirect her calls to an office mate's telephone. Such systems, although desirable, are dramatically limited by their inability to selectively forward calls. Once a subscriber has specified a forwarding number to which the subscriber's calls should be forwarded, all of the subscriber's calls are forwarded to that number, regardless of the time of day, day of the week, identity of the calling party, or status of the telephone to which calls are being forwarded.

SUMMARY OF THE INVENTION

The problems of prior Call Forwarding systems are overcome by employing an intelligent network configured to selectively forward calls.

The intelligent network includes a Service Switching Point (SSP), a Service Control Point (SOP), and a Service Management System (SMS). A call to a network subscriber is routed to the SSP which is used to detect Call Forwarding "triggers"—conditions which require the SSP to initiate selective Call Forwarding service. When a Call Forwarding trigger is detected the SSP passes the subscriber's (called party's) number to the SOP and requests call handling instructions from the SOP. The SOP provides the call handling instructions, as provisioned by the subscriber, and the SSP forwards the call in accordance with the instructions. The SMS formulates and sends commands to the SOP for such purposes as changing the stored subscriber instructions or updating service features.

Through the use of the SSP, SCP, SMS, and their associated triggering mechanism a forwarding destination for a call may be made to depend upon the time of day, day of the week, caller's identity, and/or status of the called telephone.

BRIEF DESCRIPTION OF THE DRAWING

FIG. 1 is a simplified block diagram of a network, including intelligent network components, suitable for use with the present invention.

DETAILED DESCRIPTION

Before describing an exemplary embodiment of the invention, it will be useful to describe in a general manner the key intelligent network elements which can be used to implement the invention. Intelligent network components suitable for implementing the invention, in view of this disclosure, are well-known in the art and are commercially available from the AT&T Corporation ("AT&T") under the A-I-Net™ advanced intelligent network family of products.

The intelligent network architecture superimposes on an existing telecommunications system a modular configuration of network elements which provide enhanced telecommunications services. Switching functions are performed by the base network in a conventional manner. The intelligent network includes a service switching point (SSP), a service control point (SCP), and a service management system (SMS). The intelligent network may also include an intelligent processor. One skilled in the art will appreciate that the intelligent network elements could be owned or controlled by a local exchange carrier (LEC), an interexchange carrier (IXC), a competitive access provider, or some combination of the three.

The SSP is a switch that operates to recognize service requests, requests call handling instructions from an SCP, and executes those instructions to complete a telephone call. The SSP provides intelligent network "triggering"—detecting a condition which requires the SSP to initiate the intelligent network service by sending a query to the SCP. As described below, the intelligent call forwarding service of the invention has its own "trigger profile," or set of data, that assigns the service a unique point of entry into intelligent network functions. The SSP also formulates and transmits requests to the SCP and processes replies and requests from the SCP. In addition, the SSP creates and plays intelligent network announcements formulated by the service provider (e.g., the local exchange or inter-exchange carrier), and transmits event messages (such as busy or no reply signals) to the SCP. The SSP illustratively is an AT&T 5ESS® switch provisioned with AT&T's A-I-Net™ intelligent software to provide SSP functionality.

It should be noted that the SSP is capable of functions other than those mentioned above, such as processing billing records for a call. However, these "other functions" are beyond the scope of this invention, and therefore will not be described in detail.

The SCP is an intelligent network element which stores call control and call routing instructions to be executed by an SSP. It receives and processes event messages from the SSP, and formulates and sends responses to the SSP. In addition, the SCP processes accounting and statistical information, such as the number of the calling party, the dialed intelligent network number, the time of day and day of the week of the call, and various other call parameters. An example of an SCP capable of implementing the foregoing functions is AT&T's A-I-Net™ SCP. The SCP interfaces with and receives commands for controlling services and service features from the SMS.

The SMS is a management and provisioning system that serves as an intelligent network service administration platform. The SMS formulates and sends commands to the SCP to control services and service features. An example of an SMS is the AT&T A-I-Net™ service management system.

The intelligent processor provides specialized functionality, such as speech recognition (identifying spoken words) and voice recognition (recognizing the voice of a particular speaker) capability. The intelligent processor also may perform the functions of a video signal generator or video signal database for applications such as providing images for use in a video telephone call forwarding service. The functionality of the intelligent processor may be implemented in a separate network element, or may be implemented through a multimedia SCP. As mentioned above, examples of services which may be provided by the intelligent processor are speech recognition and voice recognition. Other examples of services that may be offered through the intelligent processor include voice digit dialing and name dialing. Intelligent processor equipment suitable for use with the invention is well known in the art of intelligent network systems.

One area of intelligent call processing that merits special attention is the concept of "triggering." Triggering is the process by which a switch (e.g., an SSP) determines that a query message requesting call processing instructions will be sent to an SCP. A trigger is an occurrence of an event and/or the satisfaction of certain conditions which results in a message to the SCP. Triggers can be originating triggers, mid-call triggers, or terminating triggers. Examples of originating triggers are off-hook immediate, offhook delay triggers, and custom dialing plan triggers. An example of a mid-call trigger is the busy condition. An example of a terminating trigger is the ring-no answer condition. In the intelligent call forwarding method of the present invention distinct call forwarding routines may be initiated in response to each trigger.

Having described in a general manner the function of the principal intelligent network elements, an exemplary network architecture suitable for implementing the present invention will now be described. In the description references will be made to FIG. 1.

Assume for purposes of illustration that the called party at a first telephone station 10 is busy on a call with a party at a second telephone station 12, and that there is an incoming call for telephone station 10 from a third telephone station 14. The call between telephone stations 10 and 12 extends from telephone station 12 to a LEC switch 16, and is routed through an SSP 18 to the called party at telephone station 10. The call from telephone station 14 is extended to a LEC switch 20 and routed via an IXC switch 22 to SSP 18.

At this point, it should be noted that there are many well known means for coupling telephone calls between telephone stations. Examples of such coupling means, all of which are suitable for use in the present invention, are: standard telephone lines, twisted shielded pair lines, coaxial cables, fiber optic lines, and wireless links. It should also be noted that various types of "calls" and various types of "telephone stations" fall within the scope of the invention. For example, a "call" may take the form of a data transmission from a computer or a fax transmission from a facsimile machine. Moreover, "telephone stations" to which calls are forwarded may include dedicated answering machines, such as a voice mailbox.

In any event, SSP 18 functions as described above. When the call from telephone station 14 is routed to SSP 18, the SSP attempts to route the call to telephone station 10. SSP 18 detects that telephone station 10 is busy on another call, which produces a mid-call trigger. That is, the busy condition at telephone station 10 triggers SSP 18 to send a query, the called telephone number, and the calling telephone number (i.e., the ANI of telephone station 14) to an SCP 24. Based on this information, the SCP accesses a database and retrieves a set of call processing instructions that correspond to the call forwarding service prearranged, or "subscribed to", for telephone station 10. The SCP may then direct the SSP to carry out one or more commands that are set forth in the instructions.

Communications between the SSP and SCP may be carried out over a Common Channel Signaling (CCS) network. CCS networks are well known in the art of telecommunications. They are generally used to communicate call control information among network elements, and they typically employ packet switching techniques to accomplish this task. The packet switches used in CCS networks are commonly referred to as Signal Transfer Points (STPs). In one possible implementation of a CCS, STPs are used in conjunction with CCS data links to pass call control information via a Signaling System 7 (SS7) protocol.

Regardless of whether or not a CCS is used to couple the SSP and SCP, the call forwarding operation proceeds as follows. SCP 24 notifies SSP 18 to play appropriate announcements to the caller at telephone station 14 and to expect additional inputs (e.g., Dual Tone Multi Frequency (DTMF) digits or voice commands) from the caller. SSP 18 plays an announcement to the caller requesting the caller's Personal Identification Number (PIN) and collects digits from the caller. SSP 18 then forwards the digits to SCP 24, which determines the appropriate call processing on the basis of the caller-provided information. This may be, for example, to forward the caller to a voice messaging system and indicate to telephone station 10 that the caller is leaving a message. However, one of ordinary skill in the art will appreciate that the appropriate call processing may be determined on the basis of the ANI rather than on the basis of the caller-provided information.

SCP 24 is provisioned to provide call processing instructions, passed to it from an SMS 25, to SSP 18. SSP 18 then executes the instructions provided by the SCP. As described above, one possible set of instructions includes: collecting a PIN number from the caller, using the PIN to determine a forwarding destination for the caller, and forwarding the caller to the forwarding destination. Other possible sets of instructions allow for the forwarding destination to be dependent on the time of day and/or day of the week. To illustrate time/date dependent forwarding, mid-call triggering will again be considered.

The time/date dependent forwarding of a call may proceed as follows. A call from telephone station 14 is routed to SSP 18 which attempts to route the call to telephone station 10. SSP 18 detects that telephone station 10 is busy on another call, resulting the production of a mid-call trigger on the busy condition. That is, the busy condition at telephone station 10 triggers SSP 18 to query an SCP 24 for call processing instructions. The SCP then instructs SSP 18 to collect a PIN from the caller, as in the previous example. The time of day and/or day of week may be collected from the caller in the same manner that the PIN was collected, or it may be retrieved from a clock. In either case, once the time/date information is collected, it may be used in conjunction with the PIN to determine a forwarding destination in accordance with the called party's (subscriber's) instructions.

In both the foregoing caller identification based forwarding and time/date based forwarding illustrations, the call is forwarded in response to a mid-call trigger. An example of call forwarding in response to a terminating trigger is described below.

In the ring-no answer scenario, a call from telephone station 14 is routed to SSP 18, which attempts to route the call to telephone station 10. When there is no answer at telephone station 10, a terminating trigger is generated and the SSP queries the SCP for call processing instructions. At this point, the call may be handled as it was in the busy condition case. That is, the call may be forwarded on the basis of the caller's identity and/or on the basis of the time/date; or, in the alternative, the call may be unconditionally forwarded to a predetermined destination.

The configuration of FIG. 1 is shown as including an intelligent processor 26. Although the basic features of the invention may be implemented without the intelligent processor, the intelligent processor allows many enhanced features to be offered.

SSP 18 may utilize intelligent processor 26 to perform one or more specialized functions for interfacing with the caller at telephone station 14. For example, if SCP 24 instructs SSP 18 to collect a voice print of the caller that will be used to determine the caller's identity, SSP 18 will, in some instances, use intelligent processor 26 to collect and analyze the print. In those instances, intelligent processor 26 collects a voice print, uses the print to generate an indication of the caller's identity, provides caller's identity to the SCP, and awaits further call processing instructions.

Intelligent processor 26 may also provide a video signal generation capability that is useful for processing video telephone and/or multimedia calls. For example, when a caller at telephone station 14 places a video call to telephone station 10, SSP 18 detects that telephone station 10 is busy on another call and queries SCP 24 for call processing instructions. SSP 18 then forwards an indication that the call is a video call, an indication of a busy condition, the called telephone number, and the calling telephone number to SCP 24. SSP 18 and SCP 24 process the call as described above, but in addition provide a video signal to telephone station 14—the video signal being indicative of the forwarding destination of the call. In one possible embodiment, SCP 24 specifies to SSP 18 the type of video signal to be provided, and SSP 18 requests the appropriate video signal from intelligent processor 26. Intelligent processor 26 then plays the video signal to telephone station 14.

One skilled in the art will appreciate that various modifications can be made to the described embodiments without departing from the scope of the invention. For example, the calls between telephone stations 10 and 12 and between telephone stations 10 and 14 could be routed through other network elements, such as additional IXC switches. Also, the intelligent call forwarding service of the invention could be provided for calls to or from a mobile telephone, such as a cellular phone, or via cable television facilities. For example, a call placed from mobile telephone 28 (see FIG. 1) via a commercially available mobile telephone switch 30 could be routed through switches 20 and 22 to SSP 18 for processing as described above.

We claim:

1. A call forwarding method, comprising the steps of:
    a) coupling a call directed to a first telephone station to a service switching point, said call being initiated by a caller at a video telephone station;
    b) using said service switching point to detect that said first telephone station is in a busy condition;
    c) generating a query at said service switching point in response to said busy condition and sending said query from said service switching point to a service control point; and
    d) responding to said sending of said query by:
        (i) determining a forwarding destination for said call;
        (ii) using an intelligent processor to play a video signal that is indicative of said forwarding destination to said video telephone station; and
        (iii) forwarding said call to said forwarding destination.

2. A call forwarding method according to claim 1, wherein the step of determining a forwarding destination comprises the steps of:
    determining a number for said first telephone station; and
    determining a forwarding destination based on said number.

3. A call forwarding method according to claim 1, wherein the step of determining a forwarding destination comprises the steps of:
    determining a time of day; and
    determining a forwarding destination based on said time of day.

4. A call forwarding method according to claim 1, wherein the step of determining a forwarding destination comprises the steps of:
    determining a day of the week; and
    determining a forwarding destination based on said day of the week.

5. A call forwarding method according to claim 1, wherein the step of determining a forwarding destination comprises the steps of:
    (i) playing an announcement to said caller and collecting a personal identification number from said caller; and
    (ii) determining a forwarding destination for said call based on said personal identification number.

6. A call forwarding method according to claim 1, wherein the step of determining a forwarding destination comprises the steps of:
    (i) playing an announcement to said caller and collecting a voice print from said caller; and
    (ii) using said intelligent processor to analyze said voice print and determine a forwarding destination based on said voice print.

7. A call forwarding method, comprising the steps of:
    a) coupling a call directed to a first telephone station to a service switching point, said call being initiated by a caller at a video telephone station;
    b) using said service switching point to detect that first telephone station is in a ting-no answer condition;
    c) generating a query at said service switching point in response to said ring-no answer condition and sending said query from said service switching point to a service control point; and
    d) responding to said sending of said query by:
        (i) determining a forwarding destination for said call;
        (ii) using an intelligent processor to play a video signal that is indicative of said forwarding destination to said video telephone station; and
        (iii) forwarding said call to said forwarding destination.

8. A call forwarding method according to claim 7, wherein the step of determining a forwarding destination comprises the steps of:
    determining a number for said first telephone station; and
    determining a forwarding destination based on said number.

9. A call forwarding method according to claim 7, wherein the step of determining a forwarding destination comprises the steps of:

determining a time of day; and determining a forwarding destination based on said time of day.

10. A call forwarding method according to claim 7, wherein the step of determining a forwarding destination comprises the steps of:

determining a day of the week; and determining a forwarding destination based on said day of the week.

11. A call forwarding method according to claim 1, wherein the step of determining a forwarding destination comprises the steps of:

(i) playing an announcement to said caller and collecting a personal identification number from said caller; and (ii) determining a forwarding destination for said call based on said personal identification number.

12. A call forwarding method according to claim 1, wherein the step of determining a forwarding destination comprises the steps of:

(i) playing an announcement to said caller and collecting a voice print from said caller; and (ii) using said intelligent processor to analyze said voice print and determine a forwarding destination based on said voice print.

* * * * *